Feb. 6, 1968  C. O. JORGENSEN  3,368,152
TRIGGERED TIMING GENERATOR COMPENSATED FOR VARIATIONS IN
TRIGGERING RATE DUE TO INPUT REPETITION RATE VARIATIONS
Filed Jan. 29, 1965  2 Sheets-Sheet 1
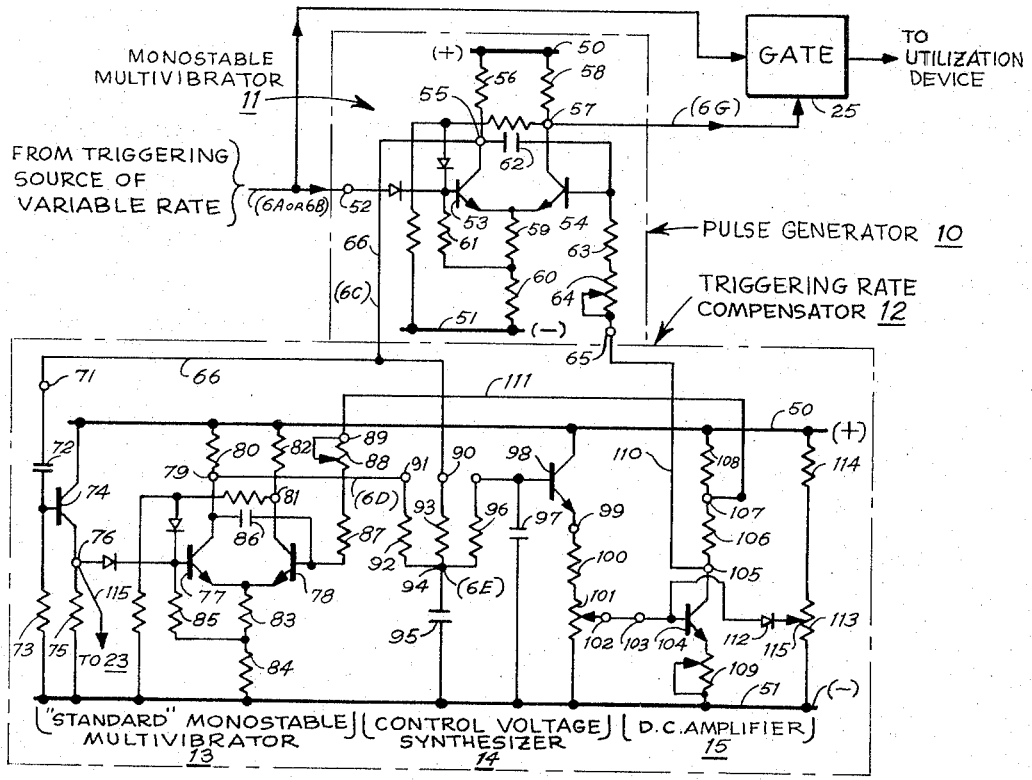
Fig.1.
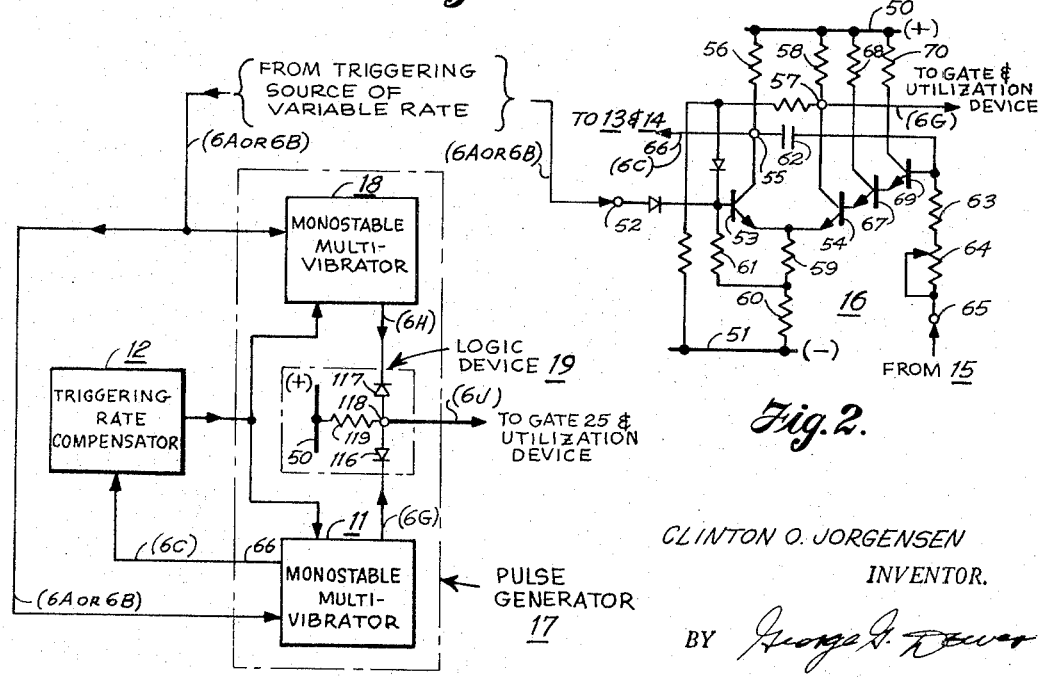
Fig.2.
Fig.3.
CLINTON O. JORGENSEN
INVENTOR.
BY
AGENT

CLINTON O. JORGENSEN
INVENTOR.

BY
AGENT

United States Patent Office 3,368,152
Patented Feb. 6, 1968

3,368,152
TRIGGERED TIMING GENERATOR COMPENSATED FOR VARIATIONS IN TRIGGERING RATE DUE TO INPUT REPETITION RATE VARIATIONS
Clinton O. Jorgensen, Los Angeles, Calif., assignor to Thiokol Chemical Corporation, Bristol, Pa., a corporation of Delaware
Filed Jan. 29, 1965, Ser. No. 429,025
30 Claims. (Cl. 328—140)

This invention relates to timing apparatus for generating single and multiple output pulses responsive to a triggering pulse supplied by a recurrent signal source, and compensating output pulse duration and onset time phase relationship according to variations in triggering signal rate of recurrency. Output signals are then used for gating desired portions of the recurrent signal for further utilization in, for example, electronic adaptive controls, analyzers, computers, evaluators and the like.

The gating of recurrent signal sources has become an important tool in the real time analysis, evaluation and control of a variety of recurrent phenomena. This is especially true in precision operations involving recurrent signals whose sources, for example, include physiological subjects, electrical and mechanical structures, and space and geophysical media. Generally, the character of such signals are either electrical, acoustical, or otherwise vibratory in nature; have wave forms ranging from simple to complex; and occur in their respective sources naturally, or at times through stimulation or induction, at rates of recurrency spanning a wide range from a fraction of a cycle per day to megacycles per second. Thus, it is understandable why the use of signal gating has become desirable in the aforementioned operations.

Heretofore, employing the signal gating technique in connection with many of the recurrent phenomena proved useful only at a steady prescribed rate of recurrency. Deviations from the prescribed rate of recurrency, caused by natural manifestations, a changing environment, or in other ways, produced substantial undesirable effects on accuracy and performance of operations. These undesirable effects were attributed frequently to apparatus incapability of coping with rate variations; at times to the non-linear characteristic of the rate variation; in some instances to the variation in duration of a desired portion of a recurrent cycle or the time phase relationship of one event respective another; and in other cases to a combination of the foregoing in various proportions one to another.

A better appreciation of some undesirable effects of signal gating will be realized after first considering some of the recurrent phenomena characterizing, for example, human physiological subject. This phenomena includes electrocardiac, electroencephalic and myoelectric signals, in addition to auscultatory sounds and a host of other acoustical signals. All of these occur either naturally or through stimulation within and about the body and at prescribed rates of recurrency. In cardiology, for example, cardiac rate is known to vary not only from person to person but in an individual under examination. Because of recent developments in cardiac mass screening techniques, it has been discovered that only selected portions of the systolic and diastolic intervals in the cardiac cycle need be analyzed and evaluated. However, when employing signal gating techniques for establishing duration and time phase relationships in each selected portion of the cardiac cycle, variations in cardiac rate will produce timing errors in the gating operations. This erroneously distinguishes normal from abnormal subjects if the operational apparatus is not compensated for such variations.

Similar types of errors will occur in vibrational analysis of structures having static, quasi-static or rotational members such as are found in aircraft and missiles, ships, automobiles and the like. where signal gating techniques are employed in the related operational apparatus. Likewise, in internal combustion engine operational analysis, errors may be attributed to variations in ignition timing and valve bounce relative to crankshaft angular position. Moreover, errors are encountered in acoustical detection and simulation apparatus as well as in seismic detection and exploration devices wherein, for example, timing standards may vary in rate of recurrency. The aforementioned and other disadvantages are substantially overcome by the present invention.

Accordingly, an object of this invention is to provide timing apparatus for generating at least one output pulse responsive to a triggering pulse supplied by a recurrent signal source (the output pulse duration being shorter than the recurrence period) and compensating the duration thereof according to variations in triggering signal rate of recurrency, and applying the pulse for gating a desired portion of the recurrent signal for further utilization.

Another object is to provide timing apparatus for generating at least one output pulse responsive to a triggering pulse supplied by a recurrent signal source (the output pulse duration being shorter than the recurrence period) and compensating the onset time phase relationship thereof according to variations in triggering signal rate of recurrency, and applying the pulse for gating a desired portion of the recurrent signal for further utilization.

While another object is to provide timing apparatus for generating multiple output pulses (the output pulse durations being shorter than the recurrence period) responsive to a triggering pulse supplied by a recurrent signal source and respectively compensating both the duration and onset time phase relationship thereof according to variations in triggering signal rate of recurrency, and applying the pulses for gating desired portions of the recurrent signal for further utilization.

Still another object is to provide a timing generator having a compensator for modulating at least one output pulse characteristic either directly or inversely proportional to deviations of the triggering signal rate from a standard rate of recurrency.

While still another object is to provide a timing generator having compensated output pulses wherein the application of compensation is regulated according to linear and non-linear characteristics of triggering signal rate.

Another object is to provide a precision, simple, inexpensive and reliable timing apparatus having at least one compensated output pulse and operable over a wide range of triggering signal rates.

Other objects and features of the present invention will become apparent from the following description taken in connection with accompanying drawings in which:

FIGURE 1 is a schematic diagram of timing apparatus consisting of a triggered timing generator, including a triggering rate compensator, and a gate for gating a recurrent signal source so as to supply an output pulse at the beginning of a recurrent cycle.

FIGURE 2 is a schematic diagram of a modified component usable in a compensated timing generator.

FIGURE 3 is a schematic diagram of a compensated timing generator having an output pulse occurring within a recurrent cycle and whose duration and onset time phase relationship are modulated inversely according to variations in triggering signal rate of recurrency.

Figure 4:
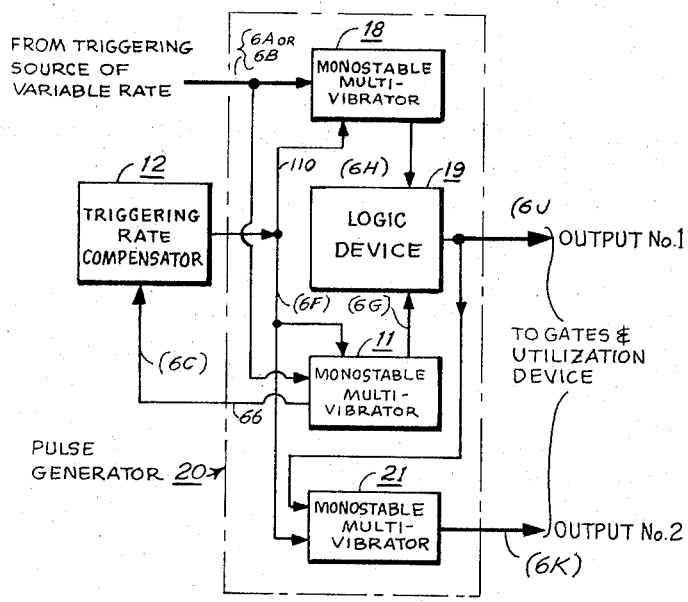
FIGURE 4 is a schematic diagram of a compensated timing generator having two simultaneously initiated output pulses of different durations, each having their duration and onset time phase relationship modulated inversely according to variations in triggering signal rate of recurrency.

In one embodiment of the present invention, as shown in FIGURE 1, there is contemplated timing apparatus comprising a compensated pulse generator 10 responsive to a primary triggering signal of variable recurrency supplied by a recurrent signal source for generating a single output pulse of nominal duration, and a triggering rate compensator 12 operative in dependency on pulse generator 10 output pulse. Pulse generator 10 includes a monostable multivibrator having a time delay circuit adapted to modulate the nominal output pulse duration inversely proportional to the receipt of a different control voltage. Compensator 12 synthesizes the differential control voltage proportional to increases and decreases of the primary triggering signal rate from a nominal standard rate of recurrency. The standard rate of recurrency has an interval equal to the sequential sum of the output pulse duration and a subsequent standard duration pulse established within compensator 12.

Other embodiments contemplate additional pulse generators for supplying more than one output pulse having their onset time phase as well as duration modulated in various proportions one to another respective at least one differential control voltage. Moreover, a feedback loop within compensator 12 is contemplated for modulating the standard rate of recurrency, thereby extending an initial range of compensation effects on pulse generator 10.

Reference is made hereinafter to transistorized monostable multivibrators, singly and in combinations. For convenience, design conditions have been assumed whereby each of these are operative responsive to a positive transition triggering pulse of suitable amplitude and minimal duration. Other references to these conditions will not be noted, unless they are of particular importance to the invention.

Referring now to FIGURE 1, there is shown timing apparatus consisting of pulse generator 10, triggering rate compensator 12 and gate 25. Pulse generator 10 consists essentially of modified conventional monostable multivibrator 11 arranged for alternate stable and variable unstable states of operation. Positive and negative buses 50 and 51 are connected to a suitable steady DC source. Input terminal 52 is connected to a primary triggering signal source of variable recurrency. It is also connected to unidentified conventional blocking diode means for immunizing input terminal 52 against triggering signals during the variable unstable state of operation. Thereafter, conduction is established to the base of switching transistor 53 which, along with transistor 54, is designated as n-p-n type. However, the p-n-p variety may be substituted with equal success over a wide range of triggering rates.

The collector of transistor 53 is connected to negative transition output terminal 55 and then through resistor 56 to positive bus 50. Transistor 54 collector is connected to positive transition output pulse terminal 57 through resistor 58 to positive bus 50. The emitters of both transistors 53 and 54 are joined together and commonly connected to voltage divider biasing means including serially connected resistors 59 and 60, the latter terminating at negative bus 51. The base of transistor 53 is biased by resistor 61 whose opposite end is connected to the juncture between resistors 59 and 60.

A modified RC timing circuit governs the nominal duration of the output pulse during the variable unstable state of operation and includes capacitor 62 dynamically coupling the collector of transistor 53 to the base of transistor 54. The resistance component includes serially connected resistor 63 and rheostat 64, the former having an end connected to the base of transistor 54 and the latter connected to control voltage terminal 65. Generally, terminal 65 is connected by means of conductor 110 to output terminal 105 of DC amplifier 15 later described.

In this embodiment, triggering rate compensator 12 employs a standard or reference duration pulse monostable multivibrator 13, control voltage synthesizer 14 and DC amplifier 15, all interconnected with each other and pulse generator 10 as detailed below.

Standard or reference duration pulse multivibrator 13 is preceded by a differentiator having an input terminal 71 connected by conductor 66 to monostable multivibrator 11 negative transition output terminal 55. The differentiator consists of series capacitor 72 which couples input terminal 71 to the base of transistor 74, and resistor 73 which shunts capacitor 72 to negative bus 51.

Transistor 74 is arranged in an emitter-follower amplifying circuit wherein its collector is connected to positive bus 50. Its emitter is connected to multivibrator 13 input terminal 76 and then through load resistor 75 to negative bus 51.

Standard or reference duration pulse multivibrator 13 is a modified conventional monostable multivibrator substantially the same as multivibrator 11, save its RC timing circuit constant. For convenience, components in multivibrator 13 are identified for the most part with different reference numerals than their corresponding ones in multivibrator 11. Input terminal 76 is conductive with the emitter of transistor 74 for receiving a triggering signal. It is also connected to conventional unidentified blocking diode means for immunizing input terminal 76 against triggering signals during the unstable state of operation. Thereafter, conduction is established to the base of switching transistor 77 which, along with switching transistor 78, is designated as n-p-n type. Here too, the p-n-p variety may be substituted.

The collector of transistor 77 is connected to negative transition output terminal 79 and then through resistor 80 to positive bus 50. Transistor 78 collector is connected to positive transition output terminal 81 through resistor 82 to positive bus 50. The emitters of both transistors 77 and 78 are joined together and commonly connected to voltage divider biasing means including serially connected resistors 83 and 84, the latter terminating at negative bus 51. Biasing resistor 85 interconnects the base of transistor 77 with the juncture between resistors 83 and 84.

A modified RC timing circuit governing the nominal value of the standard duration output pulse includes capacitor 86 dynamically coupling the collector of transistor 77 to the base of transistor 78. The resistance component in this case includes serially connected resistor 87 and rheostat 88, the former having an end connected to the base of transistor 78 and the latter connected to control voltage terminal 89. In this instance, terminal 89 is connected by feedback conductor 111 to output terminal 107 of DC amplifier 15 later described. However, where feedback is not desired, terminal 89 may instead be returned to positive bus 50.

Control voltage synthesizer 14 includes a pair of input terminals 90 and 91. Terminal 91 is connected to negative transition output terminal 79 on multivibrator 13 and terminal 90 is connected by conductor 66 to negative transition output terminal 55 on multivibrator 11. Input terminals 91 and 90 are respectively connected to resistors 92 and 93 of equal value, the latter two being joined together at summing junction 94 which is shunted by summing capacitor 95 to negative bus 51.

Summing junction 94 is connected to a smoothing filter consisting series resistor 96 and shunt capacitor 97, the latter's remaining electrode being returned to negative bus 51. The juncture between resistor 96 and capacitor 97 is connected to the base of transistor 98, the latter being connected as an emitter-follower with its collector returned to the positive bus 50 and its emitter to output terminal 99. A voltage divider load network consisting of serially connected dropping resistor 100 and time phase range adjustment potentiometer 101 is connected across output terminal 99 and negative bus 51. The slider of potentiometer 101 is connected to output terminal 102 which is then connected to DC amplifier 15 hereinafter described.

DC amplifier 15 for the purposes of FIGURE 1 embodiment includes a single stage inverting amplifier having input terminal 103 connected to output terminal 102 of control voltage synthesizer 14. It is also connected to the base of transistor 104 which has its emitter connected to one end of duration range adjustment rheostat 109, the latter's other end being returned to negative bus 51. Transistor 104 collector is connected to output terminal 105 and then to voltage divider network consisting of resistor 106 serially connected with resistor 108, the latter being returned to the positive bus 50. A juncture between resistors 106 and 108 provides a second output terminal 107 which has a voltage reduced from that of terminal 105. Terminal 107 is connected by conductor 111 in a feedback circuit to control voltage terminal 89 on standard monostable multivibrator 13. As previously mentioned, this connection may be omitted. Output terminal 105 is connected by conductor 110 to control voltage terminal 65 of multivibrator 11.

Amplifier 15 is provided with a non-linearizing network consisting of diode 112 whose anode is connected to the base of transistor 104 and whose cathode is connected to the slider of output linearity adjustment potentiometer 113. Potentiometer 113 is serially connected with resistor 114 to form a voltage divider network connected across positive and negative busses 50 and 51, respectively.

Gate 25 is of conventional transistor design and connected to positive and negative bus 50 and 51 sources. Its input circuit is connected to the same recurrent signal source as is terminal 52, while its output terminal is connected to a utilization device such as a tape recorder or cathode ray oscilloscope for recording or displaying the selected sequence of the input signal for analysis or observation.

It is assumed in the following description of operations that positive transition recurrent signals exemplified by FIGURES 6A and 6B are employed for triggering purposes and that their character and amplitude are distinguished from all other signal content present during the recurrent cycle. Further, that when triggering signals endure excessively during multivibrator unstable state of operation, the blocking diode means immunizes their respective input circuits against this condition. Moreover, that RC timing circuit components and additional controls are properly selected and adjusted to produce nominal wave forms exemplified by FIGURES 6C through 6M.

Figure 6:
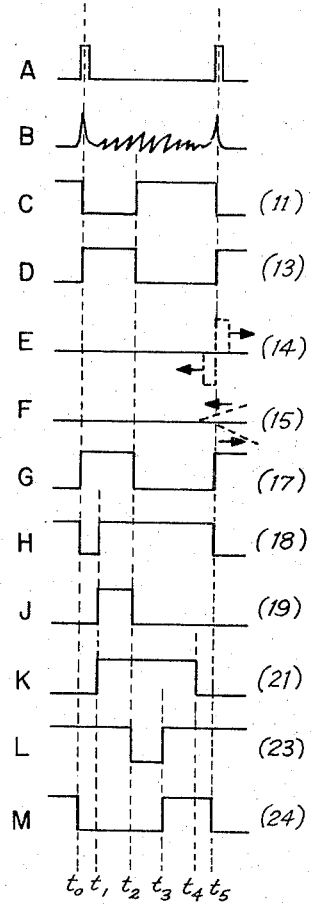
FIGURE 6 is illustrative of various wave forms appearing at selected terminals throughout the several embodiments of the present invention.

Referring back to FIGURE 1, it will first be assumed that pulse generator 10 operates at a steady triggering rate. Multivibrator 11 ordinarily maintains a stable state of operation until it receives a primary triggering signal at input terminal 52. This is delivered to the base of transistor 53 which, because of the biasing arrangement, causes transistor 53 to switch from a nonconducting to a conducting state to establish the onset of unstable state of operation as indicated in FIGURE 6 at $t_0$. Current flow through resistor 56 increases accordingly, thus causing a negative transition pulse wave form FIGURE 6C to appear at terminal 55. Simultaneously, transistor 54 is caused to switch from a conducting to a non-conducting state because of reduced base bias caused by depleting an otherwise highly charged capacitor 62 when the voltage at terminal 55 descends. Current flow through resistor 58 decreases accordingly, thus causing a positive transistion output pulse wave form FIGURE 6G to appear at terminal 57 simultaneously with the negative one at terminal 55.

Ordinarily, capacitor 62 in a conventional monostable multivibrator is allowed to recharge at a prescribed rate as determined by the current flow through resistance network 63-64 from a steady DC current source such as positive bus 50. However, in the modified multivibrator 11, capacitor 62 recharging current rate is modulated according to a differential control voltage supplied to terminal 65 by compensator 12. During the steady triggering rate condition, the nominal value of differential control voltage is adjusted so that current flowing through resistive network 63-64 causes capacitor 62 to recharge to its original value during the interval defined in FIGURE 6 between $t_0$-$t_2$. At the instant of $t_2$, transistors 53 and 54 conduction are reversed back to their original state of conduction and multivibrator 11 returned to its stable state of operation, thus terminating the output pulse 6G at $t_2$.

Output pulse FIGURE 6G from pulse generator 10 drives gate 25 into conduction. This causes gate 25 to pass a portion of the recurrent signal to the utilization device during $t_0$-$t_2$. At $t_2$ output pulse 6G decays and terminates conduction of gate 25. At the primary triggering signal rate deviates from a prescribed standard rate of recurrency, pulse generator 10 is compensated as described below and alters the actual time interval $t_0$-$t_2$ during which gate 25 is conductive.

As output pulse 6G is terminating at $t_2$, the triggering rate compensator 12 receives at its input terminal 71 a negative transition secondary triggering pulse over conductor 66. Depending on the recurrent signal source characteristic and requirements for gating the signal source, it may be advantageous to trigger compensator 12 from a separate but synchronized source. Regardless of its source, the secondary triggering signal is then differentiated by capacitor 72 and resistor 73. The differentiated signal is then applied to the base of transistor 74 where it is amplified and produces a positive transition spike which appears at terminal 76 of standard duration pulse monostable multivibrator 13.

Standard or reference monostable multivibrator 13 operates in the same manner as multivibrator 11 except for its differing time constant predetermined by the values of capacitor 86, and resistor 87 and rheostat 88. Under the steady triggering rate condition presently assumed, the RC time delay circuit causes this multivibrator to produce at terminal 79 output pulse wave form FIGURE 6D which subsists for the period defined between $t_2$ and $t_5$. For identification purposes, output pulse 6D will be referred to as a second synthesizing pulse.

Control voltage synthesizer 14 is initiated by two synthesizing pulses received in opposition at input terminals 90 and 91. The first pulse is supplied to input terminal 90 as negative wave form FIGURE 6C from output terminal 55 of multivibrator 11 during $t_0$-$t_2$. The second pulse is supplied to input terminal 91 as negative wave form FIGURE 6D from output terminal 79 of multivibrator 13 during $t_2$-$t_5$. These wave forms being sequentially contiguous define the recurrent cycle as that interval between $t_0$ and $t_5$. Both signals are conducted simultaneously in opposite polarity through coupling resistors 92 and 93 to summing junction 94 and thence to summing capacitor 95. Multivibrator 13 in its stable state ($t_0$-$t_2$) produces a positive transition output pulse 6D from terminal 79 which when applied to input terminal 91 tends to charge capacitor 95 toward a positive polarity. Simultaneously, multivibrator 11 produces a negative transition output pulse 6C from terminal 55 which when applied at terminal 90 tends to charge capacitor 95 in the opposite direction. The respective multivibrators produce opposite transition pulses during the remaining interval $t_2$–$t_5$. Thus, at a steady prescribed nominal triggering rate, a zero voltage is developed in the summing network at junction 94 and as illustrated in FIGURE 6E solid wave form.

When the primary triggering rate deviates from a prescribed standard value, the above operation will no longer hold true. For example, as the primary triggering rate increases respective the prescribed standard rate, the actual time interval between $t_0$ and $t_5$ decreases proportionally. Multivibrator 11 is then triggered prematurely thus shortening for an instant the positive transition portion ($t_2$–$t_5$) of output pulse wave form 6C. As a result, a difference in synthesizing pulses occurs and a negative net charge develops for an instant across capacitor 95 during each recurrent cycle. This charge appears at summing junction 94 as an increasing value proportional to magnitude of deviation and as wave form 6E represented by the dotted line below the solid line and preceding $t_5$. On the other hand, when the primary triggering rate decreases which corresponds to an increase in the actual time interval between $t_0$–$t_5$, multivibrator 11 output pulse 6G endures beyond $t_5$, and overlaps the terminal proportion of multivibrator 13 output wave form 6D. This produces an opposite difference in synthesizing pulses to occur, thereby developing a positive net charge on capacitor 95. The signal of this occurrence appears at junction 94 and assumes the configuration of wave form 6E represented by the dotted line above the solid line and beyond $t_5$. Thus a differential control voltage is developed proportional to both increases and decreases in primary triggering signal rate deviation from a prescribed standard rate.

The voltage appearing across summing capacitor 95 is smoothed through filter 96–97, amplified through transistor 98, and appears at output terminal 99 as an analogue control voltage whose amplitude is inversely proportional to the primary triggering signal rate deviation from the prescribed standard rate. Improved sensitivity to the deviation may be realized by additional stages of amplification preceding transistor 98. A variable fraction of the control voltage appearing at terminal 99 is available at output terminal 102 as derived from a voltage divider network 100–101, and is fed to DC amplifier 15 hereinafter described. The control voltage appearing at terminal 99 may be connected to additional amplifiers having characteristics differing from that of amplifier 15 or may be connected to an indicator whose indicia is representative of deviations from a prescribed triggering rate.

DC amplifier 15 receives at its input terminal 103 the differential control voltage delivered by synthesizer 14 from its output terminal 102. Transistor 104 amplifies and inverts this signal according to prescribed linear and non-linear characteristics and provides a differential control voltage output at terminal 105 as well as a scaled-down version thereof at output terminal 107. The output signal from terminal 105 is conducted by means of conductor 110 to control voltage terminal 65 of monostable multivibrator 11 and is represented by wave form FIGURE 6F.

The magnitude of the differential control voltage increases proportional to primary triggering signal rate. As applied to multivibrator 11, it modulates the duration of its output pulse 6G inversely proportional to primary triggering signal rate by varying the charging current of capacitor 62. Normally the modulation in output pulse duration ranges from about 3 to 1, although this sensitivity may be improved with additional stages of amplification in amplifier 15. When characteristics of the recurrent signal source require the initial output of the multivibrator 11 be modified, the standard multivibrator 13 may be modulated in the same manner as multivibrator 11. This may be accomplished, for example, by supplying a portion of the differential control voltage in the form of feedback from output terminal 107 over conductor 111 to control voltage terminal 89. Moreover, the output duration of multivibrator 13 may be modulated by a differential control voltage supplied from another source in varying proportions one to another for achieving the desired character of compensation. Otherwise, control voltage terminal 89 may be returned to positive bus 50 where it will provide for a fixed output pulse duration of multivibrator 13.

Triggering rate compensator 12 includes a number of adjustments which affect the differential control voltage characteristics and thereby vary the characteristics of the output pulse (6G) connected to operate on gate 25. For example, potentiometer 101 in control voltage synthesizer 14 provides for adjusting the time phase range of compensation beyond $t_0$ as it effects multivibrator 11 and others referred to hereinafter. Rheostat 109 provides a sensitivity adjustment for setting the range of compensation effects on the output pulse duration wave form 6G of multivibrator 11 and the like. Potentiometer 113 provides for altering amplifier 15 output linearity with respect to triggering pulse rate. This is achieved by applying a biasing voltage from slider 115 through blocking diode 112 to the base of transistor 104 in opposition to the control voltage supplied by synthesizer 14. Slider 115 position governs the magnitude of biasing voltage as well as the triggering rate level at which alteration of output linearity takes place. The net impedance between slider 115 and ground determines the degree of output linearity alteration. Other non-linearizing networks may be employed in a similar manner, if desired.

In some instances either gate 25 or utilization device characteristics may require that the output pulse from multivibrator 11, 13 or others, be modulated directly proportional to triggering pulse rate as opposed to inversely proportional as described immediately above. Under these conditions an inverter amplifier may be inserted between control voltage synthesizer 14 output terminal 102 and DC amplifier 15 input terminal 103. Alternatively, input terminals 90 and 91 of synthesizer 14 may be disconnected from conductor 66 and terminal 79, respectively, and re-connected to terminals 57 and 81, respectively. Either circuit re-arrangement will cause a negative transition control voltage to appear at terminal 65, thereby increasing multivibrator 11 output pulse duration proportional to primary triggering rate and vice versa.

Referring now to FIGURE 2, there is shown an alternate monostable multivibrator 16 which may be interchanged with that of multivibrator 11 and 12, or any of the other monostable multivibrators referred to hereinafter. It is especially useful in applications requiring extremely long output pulse intervals, such as a fraction of a cycle per day, while maintaining precise operation comparable to the other multivibrators. Generally, this circuit is a modification of multivibrator 11 but includes substantially the same components, except that values of capacitor 62 and resistor 63 are considerably larger. In addition, there is a two-stage emitter-follower amplifier interposed between the base of transistor 54 and a common connection between capacitor 62 and resistor 63. This permits a reduction in transistor base current normally supplied by capacitor 62 and is advantageous in circuits having long output pulse intervals. This amplifier includes transistor 67 whose emitter is directly coupled to the base of transistor 54 and whose collector is connected through resistor 68 to positive bus 50. Transistor 69 is directly coupled in a similar manner wherein its emitter is connected to the base of transistor 67 and its collector connected through resistor 70 to positive bus 50, however, its base is connected to the juncture between capacitor 62 and resistor 63. Otherwise, alternative multivibrator 16 is connected internally and externally in the same manner as multivibrator 11.

Operation of multivibrator 16 is substantially the same as that of multivibrator 11, except for the longer time delay value established by the RC timing circuit containing capacitor 62, resistor 63 and rheostat 64. The overall circuit may be interchanged with any of the multivibrators disclosed herein for operation in the low triggering rate range mentioned above, i.e., a fraction of a cycle per day. The additional stages of amplification involving transistors 67 and 69 provide a sharply defined output wave form such as in FIGURES 6C and 6G. Precision is thus maintained at low current levels in the timing circuit by the amplifying stages overcoming inaccuracies inherent with slow transitional changes therein at such low triggering rates. This circuit may be used at higher triggering rates and will permit the reduction in value of capacitor 62 as well as its relative magnitude of charging current. Capacitor 62 may be reduced about 50 fold per stage of amplification, other factors being equal, thereby improving overall circuit response.

Turning now to FIGURE 3, there is shown a pulse generator having a single output pulse whose onset time phase is spaced beyond the beginning of a recurrent cycle. This embodiment employs pulse generator 17 and triggering rate compensator 12.

Pulse generator 17 comprises pulse generator 10, a logic device 19 and a second monostable multivibrator 18 which is the same as multivibrator 11, except for its lower timing circuit constant and subsequently shorter output pulse duration. Input terminals 52 of both multivibrators 11 and 18 are connected in parallel and to the primary triggering signal source. Multivibrator 11 positive transition output terminal 57 is connected to logic device 19 later described. Likewise, multivibrator 18 negative transition output terminal 55 is also connected to logic device 19. Control voltage terminals 65 are commonly connected by means of conductor 110 to output terminal 105 of DC amplifier 15. Under conditions later described, it may be desirable to eliminate conductor 110 connection to terminal 65 of multivibrator 18.

Logic device 19 includes dual input circuits having a pair of diodes 116 and 117 arranged in opposition with their anodes connected back-to-back. The cathode of diode 116 is connected to positive transition output pulse terminal 57 of multivibrator 11. Diode 117 has its cathode connected to the negative transition output pulse terminal 55 of multivibrator 18. Output terminal 118 is positioned in the anode interconnection between diodes 117 and 116 and is connected through load resistor 119 to the positive bus 50. Output terminal 118 is thus designated first output terminal and is connected to the driving pulse terminal of gate 25.

Triggering rate compensator 12 is the same as in FIGURE 1. However, certain non-linear characteristics of the recurrent signal source may require the use of separate control voltage sources in connection with multivibrators 11, 13 and/or 18. In these cases additional DC amplifiers, such as 15, may be employed. Their input terminals are connected to either synthesizer output terminal 99 or 102, and their outputs connected to respective control voltage terminals 65 or 89.

Operating the timing generator structure of FIGURE 3 produces a single gating pulse according to the wave form of FIGURE 6J. Since this timing generator includes the structure of FIGURE 1, or the alternate multivibrator 16 shown in FIGURE 2, their respective descriptions of operation become a part of this description. Pulse generator 17 includes an additional multivibrator 18 whose operation is the same as multivibrator 11, 13 or 16, except for having a short duration pulse enduring from $t_0$–$t_1$. Both multivibrators 11 and 18 are coupled to the same primary triggering signal source of variable rate and operate to produce in this instance first and second logic pulses whose wave forms are illustrated in FIGURES 6G and 6H, respectively. The first logic pulse appearing as positive transition wave form 6G at terminal 57 on multivibrator 11 is coupled to logic device 19 diode 116. The second logic pulse appearing as negative transition wave form 6H is coupled from equivalent terminal 55 on multivibrator 18 to diode 117. These pulses appear in opposition at output terminal 118 and cancel each other for the duration $t_0$–$t_1$. Thereafter, positive pulse from multivibrator 11 prevails at output terminal 118 as wave form 6J because of reduced current flow through load resistor 119. This pulse drives gate 25 during the period $t_1$–$t_2$.

Triggering rate compensator 12 operates as in FIGURE 1 to deliver over conductor 110 a differential control voltage to multivibrator 11. This varies the duration of gating pulse 6J by altering the position of pulse 6G trailing edge $t_2$, respective to $t_1$. The onset time phase of output pulse 6J may be varied by supplying the differential control voltage to multivibrator 18 terminal 65, thereby modulating the duration of 6H and the corresponding edge of 6J along $t_1$. When separate amplifiers 15, or other sources, are connected to multivibrators 11, 13 and 18, their respective differential control voltages may be supplied in varying proportions one to another for modifying an initial range of compensation.

As in FIGURE 1, the differential control voltage of compensator 12 may be arranged to expand gating pulse duration and retard its onset by inserting an inverter amplifier between terminals 102 and 103 or by altering the connections to terminals 90 and 91 as previously mentioned. Further, the control voltage developed by compensator 12 may be applied as shown to multivibrator 18 thereby shortening the second logic pulse and subsequently advancing the onset or leading edge of gating pulse 6J, and simultaneously inserting an inverter amplifier between compensator 12 and monostable multivibrator 11 or by altering the connections to terminals 90 and 91 as above, either of which will cause the first logic pulse 6G to expand, if desired, thereby expanding the gating pulse 6J while advancing its leading edge.

Referring now to FIGURE 4, there is shown a timing generator structure for providing a pair of simultaneous output pulses, both having substantially the same onset time phase spaced from the beginning of a recurrent cycle, but enduring for different periods of time while terminating within the recurrent cycle. This embodiment employs pulse generator 20 and compensator 12.

Pulse generator 20 consists essentially of pulse generator 17 and a third monostable multivibrator 21, the latter being the same as multivibrators 11 and 18, except for the choice of timing circuit constant and subsequently its pulse duration. Input terminal 52 of multivibrator 21 is connected to the positive transition output terminal 118 of logic device 19, while its positive transition output terminal 57 has arbitrarily been designated as second gating pulse terminal and is also connected to the driving terminal of a second but unidentified gate similar to 25. Control voltage terminal 65 is shown to be connected by conductor 110 to compensator 12. As previously mentioned, terminal 65 may be connected to terminal 105 if desired. If not connected to terminal 105, it should be returned to the positive bus 50.

Compensator 12 is the same as described for the FIGURE 3 embodiment, including the provisions for additional DC amplifiers noted therein. Conductor 110 connects output terminal 105 to respective control voltage terminal 65 in multivibrators 11, 18 and 21.

Operation of the FIGURE 4 embodiment is substantially the same as FIGURE 3 with the addition that pulse generator 20 includes a third multivibrator 21 which operates the same as multivibrators 11 and 18, but has a longer duration. Multivibrator 21 is triggered at terminal 52 by the positive transition of the first gating pulse 6J. This triggering signal is received from logic device 19 output terminal 118 thus initiating both gating pulses 6J and 6K at the instant of $t_1$. The first gating pulse (6J) terminates at $t_2$, the second (6K) at $t_4$ after 21 times out. It should be noted that the latter is not dependent for termination upon the initiation of another multivibrator.

Triggering rate compensator 12 operates as described for FIGURE 3 with the addition of supplying to terminal 65 of multivibrator 21 a differential control voltage which varies the duration of the second gating pulse 6K inversely proportional thereto.

Alternatives recited under operation of the FIGURE 3 embodiment are also applicable to the FIGURE 4 embodiment. Moreover, multivibrator 21 producing the second gating pulse may be arranged to modulate cooperatively or independently of the pulse duration and time phase relationship of each of the other multivibrators.

Figure 5:
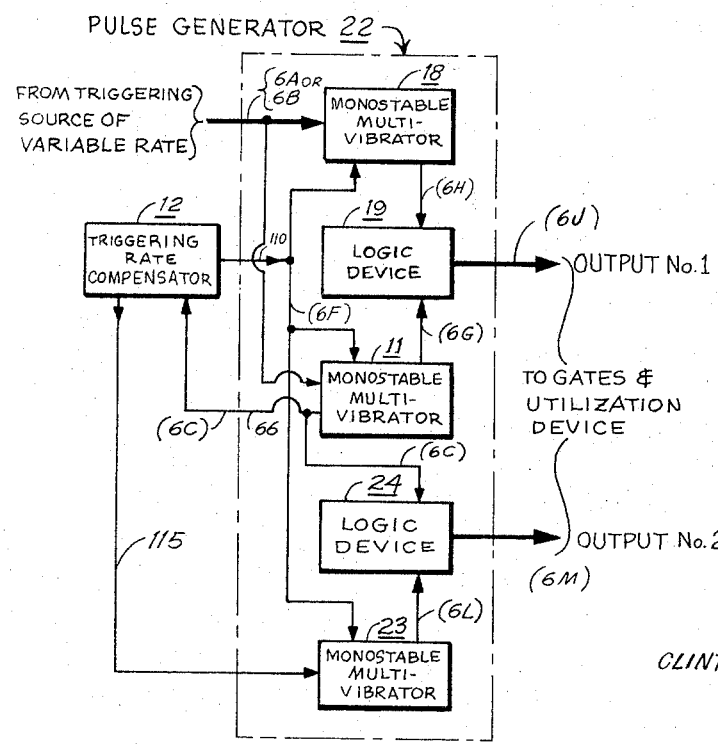
FIGURE 5 is a schematic diagram of a compensated timing generator having two output pulses occurring sequentially, the first of which occurs intermediate a recurrent cycle and the second spaced from the first and terminates at the end of the recurrent cycle, the duration and onset time phase relationship of each being modulated inversely according to variations in triggering rate of recurrency.

FIGURE 5 embodiment shows a timing generator for supplying a pair of sequential gating pulses having their respective onset time phase spaced from the beginning of a recurrent cycle and the second pulse terminating at the end of the recurrent cycle. This timing generator employs pulse generator 22 and triggering rate compensator 12 connected thereto.

Pulse generator 22 is comprised of pulse generator 17, a second logic device 24, and a third monostable multivibrator 23 for producing a third logic pulse and is the same as multivibrators 11 and 18, except for the choice of timing circuit constant which governs its nominal output pulse duration. Input terminal 52 of multivibrator 23 is connected by means of conductor 115 to input terminal 76 of standard multivibrator 13, while its negative transition terminal 55 is connected to logic device 24. Control voltage terminal 65 is shown to be connected to output terminal 105 of compensator 12. However, when the recurrent signal source characteristics require less compensation, terminal 65 may be returned to positive bus 50.

Logic device 24 is the same as 19. The cathode of its diode 116 is connected to negative transition output terminal of multivibrator 11. Diode 117 has its cathode connected to negative transition output pulse of multivibrator 23. Logic device 24 output terminal 118 in this instance is designated the second gating pulse terminal and is connected to the driving terminal of another unidentified gating device the same as 25. Alternatively, terminals 118 of both logic devices 19 and 24 may be connected to act on an "or" gate.

Triggering rate compensator 12 is the same as described for the FIGURE 3 embodiment, including the provisions for additional DC amplifiers noted therein. Conductor 110 connect output terminal 105 to respective control voltage terminals 65 in multivibrators 11, 18 and 24.

Operation of the FIGURE 5 timing generator is as follows. The description of operation given for the FIGURE 3 embodiment is applicable to the generation of first gating pulse 6J. This pulse is derived from output terminal 118 of logic device 19.

The second gating pulse is initiated when monostable multivibrator 23 receives at 57 a positive triggering pulse over conductor 115 from multivibrator 13 terminal 76 substantially in synchronism with pulse 6C trailing edge $t_2$. This produces a third logic pulse during the interval $t_2$–$t_3$ which conforms to wave form FIGURE 6L. The two negative transition logic pulses 6C and 6L from multivibrator 11 and 23, respectively, operate on the diodes of second logic device 24 successively and in contiguous duration. This causes increased current flow through load resistor 119 and produces a reduced voltage to appear at output terminal 118 during $t_0$–$t_3$. Thereafter, a positive transition gating voltage appears at terminal 118 conforming to wave form 6M which endures for the interval $t_3$–$t_5$. The second gating pulse is then terminated by the onset of a successive triggering pulse which causes multivibrator 11 to operate and again produce logic pulse 6C as above described.

As the triggering rate increases compensator 12 operates on pulse generator 22 to modulate the first gating pulse as previously described; namely, the pulse duration contracts and the time phase relationship advances toward $t_0$, both inversely proportional to triggering rate. The second gating pulse 6M automatically contracts with the onset of the next primary triggering signal defining the next recurrent cycle. The time phase relationship of its leading edge along $t_3$ is caused to advance by the contraction of pulse G6 trailing edge of multivibrator 23. As the triggering rate decreased the converse is true.

Several embodiments of the present invention permit operation of timing generators within a wide range of triggering rates spanning the region from megacycles per second to a fraction of a cycle per day. The FIGURE 1 embodiment is illustrative of timing apparatus in which multivibrator 11 is capable of operating at triggering rates in the megacycles per second range when the value of capacitor 62 is 22 mmfd. resistor 63—1800 ohms and rheostat 64 adjusted to a nominal value of about 200 ohms, thus making a total resistance of about 2000 ohms. Output pulse duration may endure for about $44 \times 10^{-9}$ seconds.

FIGURE 2 is illustrative of a timing generator in which multivibrator 16 is capable of operating at a triggering rate of a fraction of a cycle per day. In this instance, the value of capacitor 62 is about 100 mfd., resistor 63 about 900 megohms, and rheostat 64 adjusted so that the sum of 63 and 64 is equal to about 1000 megohms. Under these conditions, the output pulse will endure for about 100,000 seconds which is greater than 86,400 seconds in a day.

FIGURE 2 may be altered to permit operation at triggering rates of about 500 cycles per second by eliminating one state of amplification involving transistor 69. Further, the value of capacitor 62 in this instance should be 0.0002 mfd., resistor 63 about 0.9 megohm and rheostat 64 adjusted to 0.1 megohm whereby the sum of 63 and 64 approximates 1 megohm. The output pulse under these conditions will endure for about 0.2 millisecond.

Obviously from the foregoing teachings one or more timing generator output gating pulses may be varied responsive to a differential control voltage acting either directly or indirectly proportional to triggering rate, their duration expanded or contracted, or their time phase relationship advanced or retarded, cooperatively or independently in various proportions to each other, all according to characteristics dictated by the recurrent signal source supplying the primary triggering signals to the timing generators described herein.

The present invention has been described with certain particularity for illustrative purposes. It shall be understood that departures therefrom may be made by persons skilled in the art but that the scope of the invention is limited only to the extent defined in the appended claims.

What is claimed is:

1. In combination, input signal channel means, output signal channel means and a gate controlling timing generator comprising:

pulse generating means responsive to a triggering signal of variable recurrency from the input signal channel means for supplying at least one output pulse during each input cycle and having a duration shorter than the cycle duration and having voltage responsive control means whereby at least one output pulse characteristic is deviated proportional to a control voltage;

compensating means operative in dependency on said pulse generating means for automatically supplying thereto a differential control voltage representing deviation of the triggering signal rate from a reference rate of recurrency, and gating means connected between said input and said output channel means, said gating means being responsive during the output signal pulse of said pulse generating means to transmit said triggering signal from said input to said output signal channel means.

2. In combination, input signal channel means, and a gate controlling timing generator comprising:
  pulse generating means responsive to a primary triggering signal of variable recurrency for supplying at least one output pulse during each input cycle and having a duration shorter than the cycle duration and having voltage responsive control means whereby at least one output pulse characteristic selected from duration and time phase range is deviated proportional to a control voltage;
  compensating means operative in dependency on the pulse generating means and a secondary triggering signal keyed sequentially to the primary triggering signal for automatically supplying to the pulse generating means a differential control voltage proportional to deviation of the primary triggering signal rate from a reference rate of recurrency; and
  gating means responsive during the output signal pulse to transmit a signal from the input channel means.

3. A timing generator according to claim 2 wherein the compensating means comprises means modulating at least one output pulse characteristic inversely proportional to the primary triggering signal rate.

4. A timing generator according to claim 2 wherein the compensating means comprises means modulating at least one output pulse characteristic is modulated directly proportional to the primary triggering signal rate.

5. A timing generator according to claim 2 wherein the compensating means comprises means modulating output pulse characteristics in opposition to each other.

6. A timing generator according to claim 2 wherein separate but synchronized sources are provided to generate the primary and secondary triggering signals.

7. A timing generator according to claim 2 wherein pulse generating means is operative to supply the secondary triggering signal.

8. A timing generator according to claim 2 wherein the secondary triggering signal is initiated from the terminal portion of the first output pulse supplied by the pulse generating means.

9. The structure according to claim 2 further including a triggering signal source having signal rates within the range of a fraction of a cycle per day to at least a megacycle per second.

10. A timing generator according to claim 2 wherein the compensating means includes synthesizing means operative in dependency on first and second synthesizing recurrent pulse generating means applying pulses in opposition for developing a differential control voltage proportional to the first pulse rate deviation from a standard rate of recurrency.

11. A timing generator according to claim 10 wherein the reference rate of recurrency interval is the sequential sum of the first and second pulse durations.

12. A timing generator according to claim 11 including means for varying the first synthesizing pulse rate respective the second synthesizing pulse rate, thereby establishing an initial range of compensation.

13. A timing generator according to claim 11 including means for varying the first and second synthesizing pulse rates one respective to a portion of the other, thereby modifying an initial range of compensation.

14. A timing generator according to claim 11 including means for varying the second synthesizing pulse duration responsive the differential control voltage.

15. A timing generator as in claim 10 wherein the pulse generating means supplies the first synthesizing pulse and the compensating means includes a standard duration pulse source operative in dependency on the secondary triggering signal for supplying the second synthesizing pulse.

16. In combination, input signal channel means, and a gate controlling timing generator comprising:
  monostable pulse generating means responsive to a primary triggering signal of variable recurrency from the input signal channel means for supplying at least one output pulse during each input cycle and having a duration shorter than the cycle duration and having voltage responsive control means whereby at least one output pulse characteristic selected from duration and time phase range of each output pulse is deviated proportional to a control voltage;
  means for generating a secondary triggering signal initiated respective the terminal portion of an output pulse from the pulse generating means; and
  compensating means comprising:
    a reference duration pulse source operative in dependency on the secondary triggering signal; and
    synthesizing means operative in response to first and second synthesizing pulses respectively received from the pulse generating means and the reference duration pulse source in opposition to each other, said synthesizing means developing a differential control voltage proportional to the first synthesizing pulse rate deviation from a reference rate of recurrency, said reference rate having an interval equal to the sequential sum of the first and second synthesizing pulse durations; and
    amplifying means for amplifying the differential control voltage according to prescribed characteristics and supplying to said pulse generating means at least one differential control voltage for causing said output pulse modulation; and
  gating means responsive during the output signal pulse to transmit a signal from the input channel means.

17. A timing generator as in claim 16 wherein the reference duration pulse source consists of a monostable multivibrator operative in dependency on the secondary triggering signal for supplying the second synthesizing pulse, thereby establishing an initial range of compensation.

18. A timing generator as in claim 17 wherein the monostable multivibrator includes a time delay circuit for governing nominal output pulse duration and operative to receive a differential control voltage to modulate the nominal pulse duration proportional thereto, thereby modifying an initial range of compensation.

19. A timing generator according to claim 16 wherein the synthesizing means comprises:
  summing network means operative in dependency on said first and second synthesizing pulses for developing a net pulse proportional in duration, and of a polarity, representative of the magnitude and time phase orientation, respectively, of the first pulse rate deviation from the standard rate of recurrency;
  filter means receiving the net pulse for smoothing same and supplying a continuous differential control voltage proportional to, and representative of, said net pulse characteristics; and output means receiving the differential control voltage for delivering to the control means at least a portion of said voltage to the pulse generating means.

20. A timing generator according to claim 19 wherein the summing network includes means to develop a net pulse based on the time phase and polarity differences between the first pulse leading edge and the second pulse trailing edge.

21. A timing generator according to claim 19 wherein the output means includes further control means for adjusting the time phase range effects of compensation on the pulse generating means.

22. A timing generator according to claim 16 wherein the amplifying means includes a non-linearizing network for altering the differential control voltage characteristics, thereby producing a non-linear effect of compensation proportional to primary triggering signal rate deviation from the standard rate of recurrency.

23. In combination, input signal channel means, and a gate controlling timing generator comprising:
pulse generating means for supplying only a single output pulse during each input cycle and having a duration shorter than the cycle duration, having a modulatible duration, comprising:
monostable multivibrator means responsive to a primary triggering signal of variable recurrency for supplying an output pulse of nominal duration, said multivibrator having voltage responsive control means whereby the nominal output pulse duration is modulated proportional to a control voltage supplied thereto;
compensating means operative in dependency on the monostable multivibrator means and a secondary triggering signal keyed sequentially to the primary triggering signal for automatically supplying to the control means for the monostable multivibrator means a differential control voltage proportional to deviation of the primary triggering signal rate from a reference rate of recurrency; and
gating means responsive during the output signal pulse to transmit a signal from the input channel means.

24. A timing generator according to claim 23 wherein the monostable multivibrator means includes amplifying means operative on the voltage responsive control means responsive the differential control voltage for improving otherwise poor output pulse characteristics at triggering rates as low as a fraction of a cycle per day.

25. In combination, input signal channel means, and a gate controlling timing generator comprising:
pulse generating means for supplying at least one output pulse during each input cycle and having a duration shorter than the cycle duration, having a delayed onset and a modulatible duration, comprising:
first monostable multivibrator means responsive to a primary triggering signal of variable recurrency and coincident with the beginning of said recurrent cycle for supplying a first logic pulse of nominal duration, including positive and negative transition wave forms simultaneously;
second monostable multivibrator means responsive to the primary triggering signal for supplying a second logic pulse of nominal duration coincident with, but shorter than, the first logic pulse;
at least one of said multivibrator means having voltage responsive control means whereby the nominal pulse duration is modulated proportional to a control voltage supplied thereto; and
first logic means operative in dependency on the first and second logic pulses received simultaneously in opposition for generating a first output pulse from their net difference, said first output pulse having an onset time phase spaced from the beginning of the recurrent cycle and a duration modulatible according to the termination of said first logic pulse; and
compensating means operative in dependency on the first monostable multivibrator means and a secondary triggering signal keyed sequentially to the primary triggering signal for automatically supplying to the control means for the pulse generating means at least one differential control voltage proportional to deviation of the primary triggering signal rate from a standard rate of recurrency; and
gating means responsive during the output signal pulse to transmit a signal from the input channel means.

26. A timing generator according to claim 25 wherein both the first and second monostable multivibrator means have voltage responsive control means whereby their respective nominal pulse durations are modulated proportional to at least one differential control voltage supplied respectively thereto, thereby modulating the onset time phase spacing as well as duration of said output pulse, respectively.

27. A timing generator according to claim 25 wherein the pulse generating means includes a third monostable multivibrator means responsive to the onset of the first output pulse for supplying a second output pulse having the same delayed onset as, but differing in duration from, the first output pulse; and
second gating means responsive during the second output pulse to transmit a signal from the input channel means.

28. In combination, input signal channel means, and a gate controlling timing generator comprising;
pulse generating means for supplying at least two sequential output pulses within a variable recurrent cycle, each output pulse having at least one modulatible characteristic selected from time phase range and duration, said pulse generating means comprising:
first monostable multivibrator means responsive to a primary triggering signal of variable recurrency and coincident with the beginning of said recurrent cycle for supplying a first logic pulse of nominal duration, including positive and negative transition wave forms simultaneously;
second monostable multivibrator means responsive to the primary triggering signal for supplying a second logic pulse of nominal duration coincident with, but shorter than, the first logic pulse;
first logic means operative in dependency on the first and second logic pulses received simultaneously in opposition for generating a first output pulse from their net difference during each input cycle and having a duration shorter than the cycle duration, said first output pulse having an onset time phase spaced from the beginning of the recurrent cycle and a duration modulatible according to the termination of said first logic pulse;
third monostable multivibrator means responsive to the terminal portion of the first output pulse for supplying a third logic pulse whose nominal duration is equal to a portion of the remainder of said recurrent cycle;
at least one of said multivibrator means having voltage responsive control means whereby the nominal pulse duration is modulated proportional to a differential control voltage supplied thereto; and
second logic means operative in dependency on the first and third logic pulses received sequentially for generating a second output pulse from their sum during each input cycle and having a duration shorter than the cycle duration, said second output pulse having a modulatible onset time phase spaced from the modulatible termination of the first output pulse and a duration modulatible according to the onset of the first logic pulse in a successive recurrent cycle; and
compensating means operative in dependency on the first monostable multivibrator means and a secondary triggering signal keyed sequentially to the primary triggering signal for automatically supplying to the voltage responsive control means at least one differential control voltage proportional to modulation of the primary triggering signal rate from a standard rate of recurrency; and
gating means responsive during the first and second output pulses to transmit signals from the input signal channel means in separate channels.

29. A timing generator according to claim 28 wherein the first, second and third monostable multivibrator means each have voltage responsive control means responsive to at least one differential control voltage supplied by the compensating means for modulating the nominal value at least one characteristic of the logic pulses.

30. A timing generator according to claim 29 wherein a sub-normal level of control voltage causes at least one multivibrator means to maintain an unstable state of operation and supply a pulse enduring beyond its normal duration, thereby extending the initial range of compensation to position the respective logic pulse beyond the onset of the next succeeding primary triggering signal for an interval governed by the duration of sub-normalcy.

References Cited

UNITED STATES PATENTS

| | | | |
|---|---|---|---|
| 3,028,552 | 4/1962 | Hahs | 328—63 X |
| 3,029,389 | 4/1962 | Morphet | 328—63 X |
| 3,038,130 | 6/1962 | Gordon | 328—140 X |
| 3,071,725 | 1/1963 | McWaid | 328—141 X |
| 3,080,487 | 3/1963 | Mellott et al. | 328—63 X |
| 3,238,462 | 3/1966 | Ballard et al. | 328—63 |
| 3,249,893 | 5/1966 | Castelland | 331—113 |

JOHN S. HEYMAN, *Primary Examiner.*

ARTHUR GAUSS, *Examiner.*